Oct. 18, 1938.  E. C. GWALTNEY  2,133,446
APPARATUS FOR IMPREGNATING YARNS AND THE LIKE
Filed Oct. 9, 1935  2 Sheets-Sheet 1
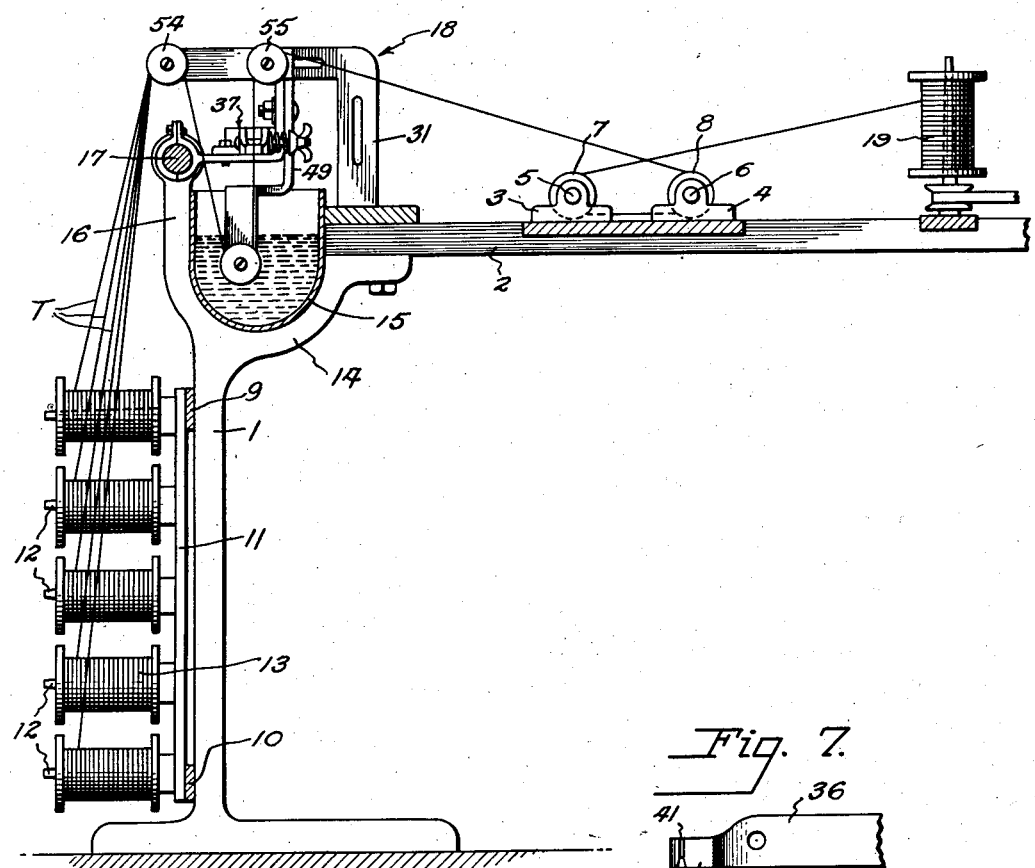
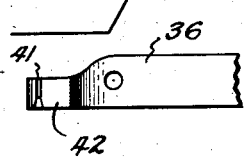
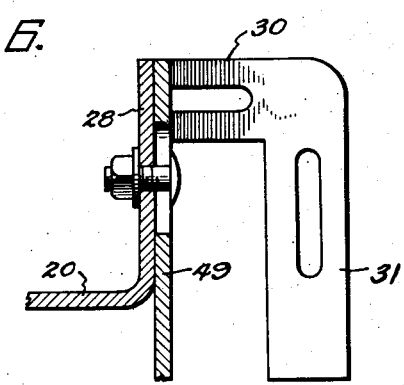
Inventor
E. C. Gwaltney
By Mason Fenwick & Lawrence
Attorneys Oct. 18, 1938.　　E. C. GWALTNEY　　2,133,446
APPARATUS FOR IMPREGNATING YARNS AND THE LIKE
Filed Oct. 9, 1935　　2 Sheets-Sheet 2
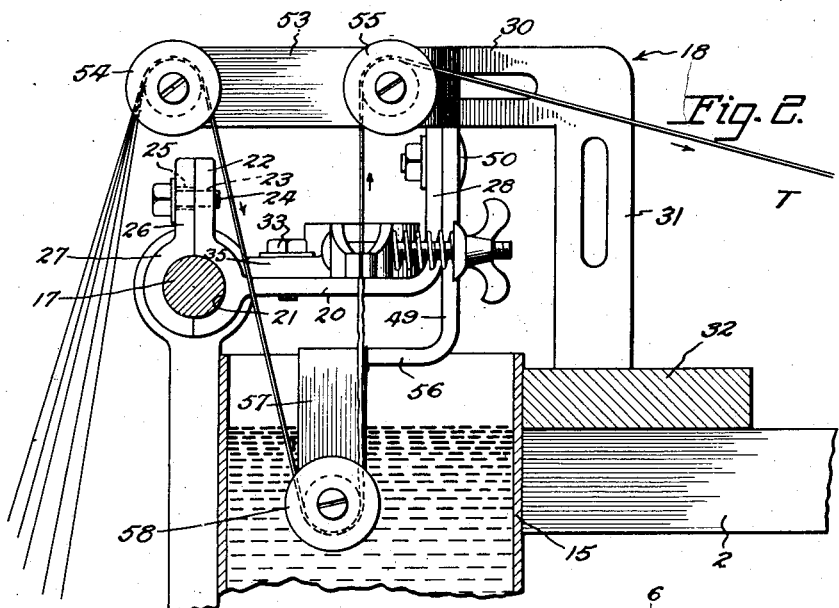
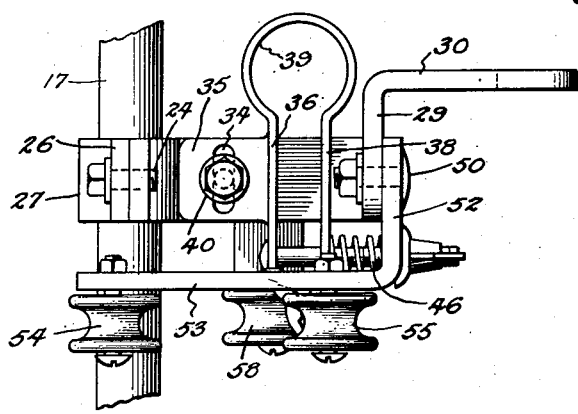
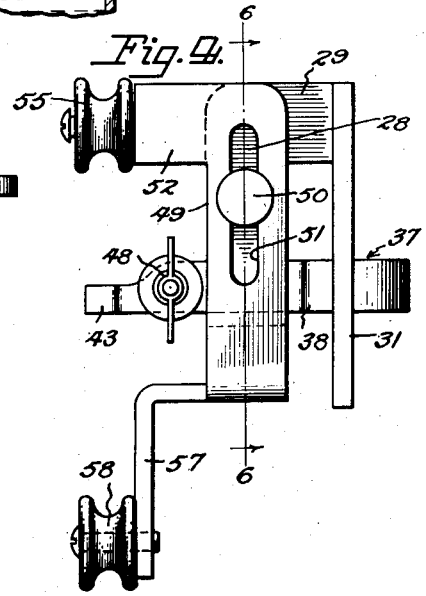

Patented Oct. 18, 1938

2,133,446

UNITED STATES PATENT OFFICE 2,133,446

APPARATUS FOR IMPREGNATING YARNS AND THE LIKE

Eugene C. Gwaltney, Macon, Ga., assignor to Bibb Manufacturing Company, Macon, Ga.

Application October 9, 1935, Serial No. 44,300

5 Claims. (Cl. 91—32)

This invention relates generally to an apparatus for thoroughly impregnating with rubber latex or any dispersion, emulsion or solution of rubber or other gums, the elemental fibers of yarns designed to be used in fabrics or to be twisted into plies or cabled to form a cord, such as is used in carcasses of rubber tires, in belting and in all products where tensile strength, insulation, resistance to heat caused by internal friction, increasing surface friction, or waterproofing, is desirable.

Apparatus heretofore employed for this purpose is highly complicated and expensive to manufacture and operate. By means of the present invention, which may be a simple attachment to ordinary textile machinery, the impregnation is effected thoroughly and continuously during the passage of the yarn from one package or spool to another in the machine.

Practically all the rubber latex of commerce is derived from *Hevea brasiliensis*, cultivated in the Middle East. As is well known, the latex is obtained by tapping the tree trunks, bulking the individual yields, and, when destined for oversea transportation, treating the latex with ammonia to preserve it and prevent coagulation in transit and subsequent storage. It normally contains about 38% to 40% of rubber and 60% to 62% of water. It is an extremely unstable product and very readily coagulates under agitation, continued exposure to air, temperature changes, or fermentation. Agitation causes especially rapid coagulation. It has been found in the prior art that the use of latex in a bath containing revolving rollers or other devices which will cause agitation has resulted in much difficulty and trouble in the operation of these devices. After the rubber once coagulates from the water solution it is impossible to turn the rubber back into the solution from which it coagulated. In addition to this, the latex on just an instant's exposure dries in a thin film and causes a particularly gummy rubber coat which is so tacky that it tends to adhere to any substance with which it comes in contact.

Many attempts have been made, as illustrated by patents in the prior art, to impregnate yarns and cord with latex; but no commercial products have been evolved. Fabrics and large size cords coated with latex have been produced commercially, but in neither of these cases are the products impregnated with the latex. It has been attempted to impregnate raw cotton or the cotton in process of manufacturing yarn, such as rovings, with latex, but it has proven impossible to spin such rovings into yarn due to the fact that it has been found impossible to prevent any material with which latex has been mixed from lapping around the rolls involved in the process. It has been found that where it has been sought to impregnate the raw cotton or the cotton in process of manufacturing yarn, that the impregnation of the cotton or the roving causes it to ball up on the machine and prevents the drafting of the fibers so it is impossible to produce yarn.

The main object of the invention, therefore, is to provide an apparatus for impregnating yarns with rubber latex, a water dispersion of latex, and any dispersion, emulsion or solution of rubber or other gums, or any combination of such substances, so as to connect the fibers of the yarn intimately to each other.

Another object of the invention is to impregnate yarns with latex whereby the yarn is impregnated with latex without any agitation of the latex from the time that the yarn enters the bath until the impregnation is completed and the surplus latex removed from the yarn.

Still another object is to provide a medium for returning the surplus latex back to the bath, with a minimum of agitation.

A further object is to provide means for controlling the amount of latex left in or on the yarn by controlling the pressure to which the yarn is subjected by the squeezing mechanism.

Other objects of the invention will appear as the detailed description thereof proceeds.

In the accompanying drawings, which are somewhat diagrammatic:

Figure 1 is a fragmentary elevation of part of the framework of a respooling machine having apparatus forming part of the present invention applied thereto;

Figure 2 is a fragmentary side elevation, to an enlarged scale, of the said apparatus;

Figure 3 is a plan of part of the apparatus for carrying out the invention;

Figure 4 is a side elevation of the aforesaid apparatus;

Figure 5 is a plan of a nipper forming one of the elements of the device;

Figure 6 is a fragmentary section taken on the line 6—6 of Figure 4; and

Figure 7 is a fragmentary side elevation of one of the elements of the nipper shown in Figure 5.

As shown in the drawings, a standard 1 is fixed, at its upper end, to a substantially horizontal cross brace 2 which supports the bearings 3 and 4 for the shafts 5 and 6 of the guide rollers 7 and 8, respectively. The standard 1 forms only one of the supporting standards of the framework, it being understood that it will be duplicated at the other end of the machine. There is nothing novel in the respooling part of the mechanism, which is shown herein somewhat diagrammatically merely for the purpose of illustrating one of the various forms of apparatus which may be used for carrying out the process involved.

Runners 9 and 10 extend lengthwise of the machine from the standard 1 to the standard (not shown) at the other end of the machine. Spaced apart along and fixed to these runners 9 and 10, is a series of uprights 11, only one of which is shown in the drawings. To each of the uprights 11, there is suitably secured a number of spindles 12 adapted to support rotatably a corresponding number of spools 13, carrying the yarn T to be impregnated.

Suitably supported by brackets 14 (only one of which is shown), is a trough 15 adapted to contain latex. An arm 16, extending upwardly from standard 1, supports one end of a cylindrical rod 17, it being understood that a similar arm extends from the standard at the other end of the machine to support the other end of the rod 17.

Directly above each of the uprights 11, there is arranged rotatably on the rod 17 a yarn guide, designated generally by the reference numeral 18 for guiding the yarn from the spools 13 through the latex in the trough 15. The yarn is drawn, as usual in respooling machines, by the power-driven spools 19 mounted for rotation on the framework of the machine.

The guide 18 comprises a strap 20 having one end shaped to provide a semi-circular recess 21 adapted to seat on the rod 17. A flange 22 extending upwardly from the recessed end of the strap 20, is provided with a screw-threaded aperture 23 to receive the screwthreaded end of a machine screw 24, which passes loosely through an aperture 25 formed in the flange 26 of a clamping plate 27 shaped to fit over the rod 17 and against the end of strap 20.

It will be obvious from inspection of Figure 2 of the drawings that the split clamping plate connection between the strap 20 and the cylindrical rod 17 is designed to permit the removal of the guide 18 bodily from the machine whenever it becomes necessary or desirable. There may be thirty or forty of these guides spaced apart lengthwise of the machine along the rod 17. Therefore, it is necessary to provide for the removal of each unit separately from the rod 17 without disturbing the other guides.

The strap 20 extends laterally, when in operative position, across the upper part of the trough 15; and is bent upwardly to form an upright member 28. The upper end of the member 28 is extended substantially parallel to the rod 17 to form a member 29 which is then bent laterally to form a substantially horizontal plate 30; the latter, in turn, being bent downwardly to form a support 31, the lower end of which rests in supported contact with a longitudinal brace 32 forming part of the framework of the respooling machine.

The strap 20 is provided with an internally threaded bore to receive the screwthreaded end of a machine screw 33 which passes freely through a slot 34 formed in a flange 35 projecting laterally from an arm 36 of a nipper, designated generally by the reference numeral 37 (see Figure 5). The nipper 37 includes a second arm 38 connected to the arm 36 by a bow spring 39 which may be integral with the arms 36 and 38.

A washer 40 is interposed between the head of the screw 33 and the flange 35; and the nipper as a whole may be rotated around the screw 33. In addition to this rotation around the screw 33, the slot 34 provides for adjustment of the nipper transversely of the strap 20. These two adjustments enable the operator to position the nipper so that its aperture 41 may be properly positioned substantially in the vertical plane of the spindles 12 which support the spools 13.

The nipper 37 is intended to squeeze the yarns passing through the aperture 41 in a manner simulating substantially the squeezing pressure which could be applied on such yarns by the thumb and finger of an operator. The spring 39 is designed to hold the arms 36 and 38 in position, and the ends 42 and 43 of the arms 36 are shaped to fit closely against each other; and are held in yielding contact with each other by means of a bolt 44 extending from the arm 36 and through an aperture 45 in the arm 38. A coil spring 46 is wound around the shank of the bolt 45 and has one end in contact with the arm 38 while the other end contacts with a flange 47 formed on a wing nut 48 screwthreaded onto the bolt 44. The extreme ends 42 and 43 are beveled to facilitate the entrance of the yarn into the nippering aperture 41; and the wing nut 48 may be adjusted to permit separation of the ends 42 and 43 for this purpose. It is intended in the operation of this apparatus to provide for the passage through the nipper of one or any number of yarns which may be found desirable; and to use a nipper, or other similar device, with an aperture of such size as that the yarn or yarns will fill the nippering aperture completely and be squeezed therein, so as to secure penetration of the yarn or yarns by the latex or other liquid used, and at the same time to remove the excess of latex, and return such excess to the trough below, with a minimum of agitation of the liquid.

This is accomplished in the attached diagram by adjusting the ends 42 and 43 by means of the wing nut 48 to permit the passage of the number of yarns desired, and to exert the pressure necessary to squeeze the liquid thoroughly into the fibers of all the yarn passing through the aperture, as well as to remove the excess of latex adhering to the yarn, and return the same to the trough with a minimum of agitation of the liquid. The yarn as it approaches the nipper is gradually compressed, the fibers being gradually forced together, the latex being carried along with the fibers of the yarn surrounding and lying between the adjacent fibers. Upon the yarn entering the opening of the nipper, pressure is exerted which not only removes the surplus latex, but the latex actually flowing out of and through the yarn under this pressure more readily penetrates the fibers themselves, or to the very heart of the yarn itself. By adjusting the pressure to which the yarn is subjected in passing through the stationary compressing device, it is possible to so regulate the amount of latex remaining in the yarn that when the yarn is dried, a substantially accurate control of rubber left in the yarn is obtained, since the greater the pressure or squeeze, the less latex is retained in the yarn. This amount can also be further controlled by concentrating or diluting the latex itself, either by removing the water, or adding water to the natural latex.

The nippering aperture may be tapered so it is larger where the yarn enters the aperture than where it leaves it. The yarn itself furnishes a path for the excess latex by which it travels back to the trough with a minimum of agitation. Furthermore, there is no moving part of the apparatus in the latex in the trough, but the guide below the surface of the latex is fixed and stationary and is composed of a material which produces as little friction as possible as the yarn is guided by it through the latex.

To guide the yarn from the spools 13 and through the liquid in the trough 15, a slotted plate 49 is adjustably secured to the member 28. The adjustment of the plate 49 on the member 28 is effected by means of a bolt 50 passing through a slot 51 formed in the plate 49 and through an aperture formed in the member 28. The upper part of the plate 49 is extended laterally to form an offset 52 which is bent to form a flange 53 on which is mounted a pair of grooved pulleys 54 and 55 adapted to guide the yarn T. The lower end of the plate 49 is bent to form a flange 56, which, in turn, is bent downwardly to form a plate 57 on the lower end of which is mounted a pulley 58. The pulleys 54 and 55 rotate on the member 53. The pulley 58 is fixed securely to the member 57, since it is obviously desirable to avoid any agitation thereof which would set up an undesirable coagulation.

As already stated, any number of yarns may be fed in parallel over the various pulleys and through the latex and nipper.

The words "nipper" and "nippering" do not refer merely to a guide aperture; but are intended to refer to any device capable of exerting on the yarn a compression sufficient to intimately connect the fibers of the yarn and to secure penetration of the fibers by the latex used and to remove the excess material without unduly agitating the same.

After the impregnated yarns have been wound on the power-operated spools 19, the separate yarns may be rewound from these spools onto separate spools, which may be used in other apparatus for further manufacture of the impregnated yarns.

In the specification and in the claims of this case, the word "yarn" or "yarns" means any single yarn or any plied yarn composed of any number of single yarn plied or folded together; and the word "cord" means any number of plied yarns twisted into a cord or cable; and the word "latex" means rubber latex, a water dispersion of latex, and any dispersion, emulsion, or solution of rubber or other gums, or any combination of such substances.

It must be understood that the invention is not to be considered as limited to the exact form of the apparatus disclosed herein, nor in any way other than that imposed by prior art, and such limitations as may be expressed in the claims.

I claim:

1. Apparatus for impregnating yarns or the like with a liquid, and comprising a support, means for drawing a yarn over said support, a tank containing said liquid, a rod on said support extending along said tank, a strap adjustable along said rod and extending over said tank, a nipper adjustable angularly and transversely on said strap, and means adjustable on said strap for guiding the yarn through said liquid nipper.

2. Apparatus for impregnating yarns or the like with a liquid, and comprising a support, means for drawing a yarn over said support, a tank containing said liquid, a rod on said support extending along said tank, a strap adjustable along said rod and extending over said tank, a nipper adjustable angularly and transversely on said strap, means adjustable on said strap for guiding the yarn through said liquid and nipper, and means for varying the pressure of the nipper on the yarns drawn therethrough.

3. Apparatus for impregnating yarns or the like with a liquid, and including a nipper having two plates connected by a bow spring and having plane surfaces held by said bow spring in yielding contact with each other, said surfaces being provided with cooperating grooves to form a nippering aperture, and adjustable means connected to said plates for varying the yielding pressure of said plates on yarns passing through said grooves.

4. Apparatus for impregnating yarns or the like with a liquid, and including a nipper having two plates connected by a bow spring and having plane surfaces held by said bow spring in yielding contact with each other, said surfaces being provided with cooperating grooves to form a nippering aperture, and adjustable means connected to said plates for varying the yielding pressure of said plates on yarns passing through said grooves, said cooperating grooves being tapered to form a conical nippering aperture.

5. Apparatus for impregnating yarns or the like with a liquid, and including a nipper comprising two plates connected by a bow spring at one end to hold their other ends normally in yielding contact with each other, said contacting ends having plane surfaces provided with cooperating grooves tapering from one edge of each plate to the other edge to form a conical nippering aperture, one of said plates having a bolt extending through an aperture in the other plate, a nut adjustable on said bolt, and a spring interposed between said nut and the second named plate.

EUGENE C. GWALTNEY.